United States Patent [19]

Ramond

[11] 3,954,209
[45] May 4, 1976

[54] INJECTION NOZZLE FOR PLASTICS MATERIALS HAVING CENTERING FOR OUTLET VALVE

[76] Inventor: Louis Maurice Ramond, 28 rue de la Baume, 42160 Andrezieux, France

[22] Filed: June 3, 1975

[21] Appl. No.: 583,165

[30] Foreign Application Priority Data
June 4, 1974   France ............................. 74.19874

[52] U.S. Cl. .............................. 222/496; 137/220; 425/146; 425/245 NS
[51] Int. Cl.² ........................................... B29F 1/03
[58] Field of Search ............ 222/496, 497; 425/245, 425/245 NS, 145, 146; 137/219, 220

[56] References Cited
FOREIGN PATENTS OR APPLICATIONS

| 34,341 | 12/1964 | Germany | 425/245 |
| 1,042,226 | 10/1958 | Germany | 425/245 NS |
| 1,168,062 | 4/1964 | Germany | 425/245 NS |

*Primary Examiner*—Robert B. Reeves
*Assistant Examiner*—David A. Scherbel
*Attorney, Agent, or Firm*—Lewis H. Eslinger; Alvin Sinderbrand

[57] ABSTRACT

An injection nozzle for plastics material comprises a rear tubular body and a hollow front body with a nozzle orifice at one end and detachably connected to the rear body at the other end, an elongate body being provided within the front and rear bodies and mounted thereon by having radially extending arms extending into an annular V-shaped groove formed by chamfers in the engaging surfaces of the front and rear bodies, the elongate body carrying a slidable closure member biassed to close the nozzle orifice.

4 Claims, 3 Drawing Figures

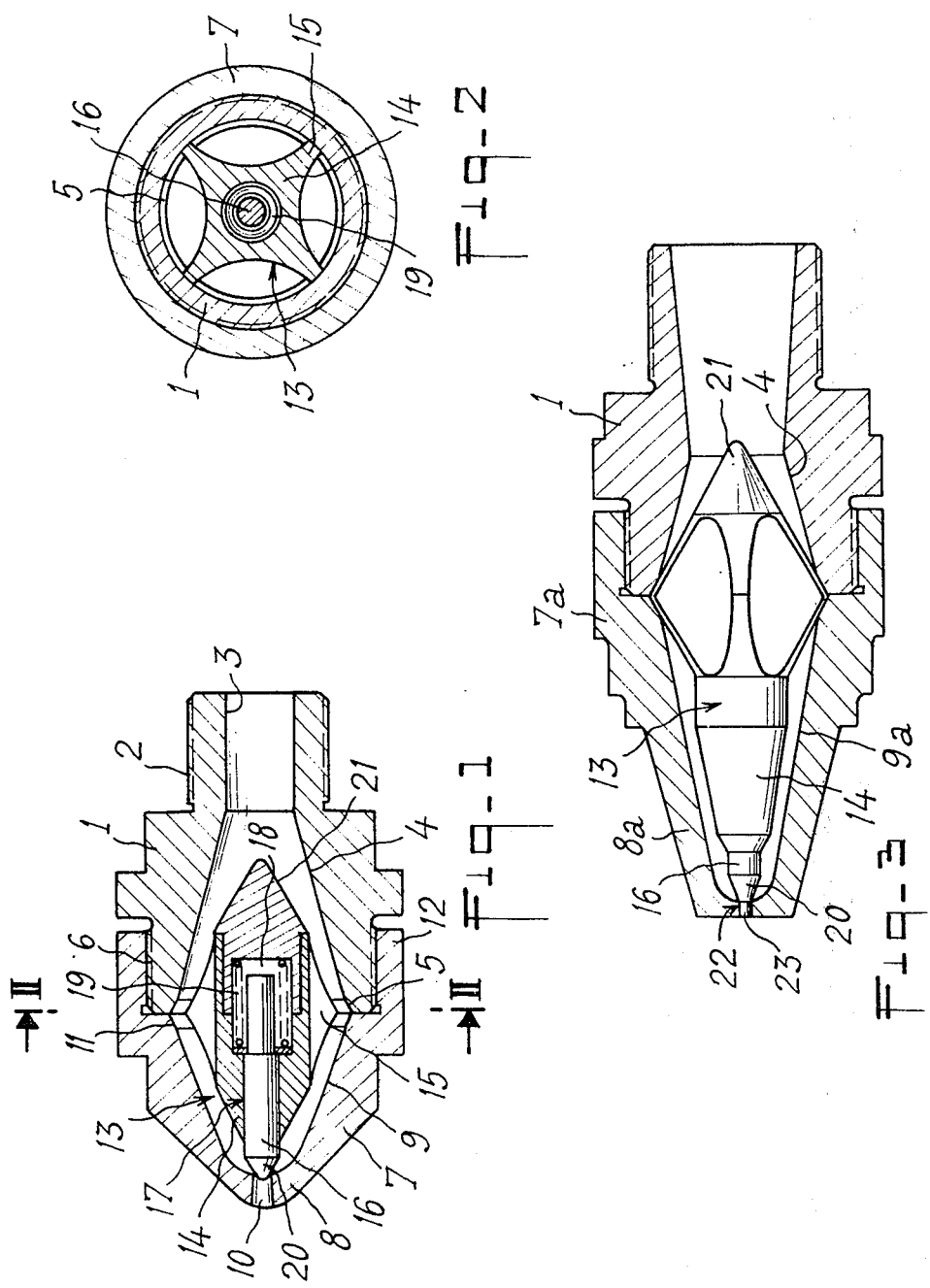

INJECTION NOZZLE FOR PLASTICS MATERIALS HAVING CENTERING FOR OUTLET VALVE

BACKGROUND OF THE INVENTION

This invention relates to plastics injection nozzles.

For the injection of plastics material, nozzles are used which comprise a movable closure device guided in a radial extension of the body and acted on to close the orifice of the injection nose by an elastic element disposed concentrically to the exterior of the body of the nozzle.

Such a type of construction enables the spring to be protected from the direct effect of the temperature of the plastics material in the plastic state, and consequently to avoid or to reduce the known weakening effect. Such a construction also enables a good axial and radial guidance of the closure device which can then be constructed with a cylindrical projection at the end forming a piston penetrating it into the cylindrical injection bore of the nose at the end of the injection phase to provide a secondary pressure.

Nevertheless, it is to be noted that nozzles of this type have two major disadvantages, that is to say, the relatively large amount of space used due to the pressure of the external spring and the existence between the guide extension and the nose, of a retentive zone or cavity or to there being less circulation of the material which thus undergoes carbonization prejudicial to the good quality of the items produced.

There are also known nozzles comprising an automatic closure element guided axially in an internal support body containing a control spring for closing the closure device. In general, the internal body relies on the reaction of the spring of the closure device on the guide seat to isolate between two phases of injection, the feed circuit and the transfer and pressure build up chamber. Such a construction has the advantage of substantially reducing the space occupied thereby and thus the external diameter of the nozzle but, on the other hand, has an important disadvantage due to the fact that in the open position, the internal body is no longer accurately guided. Consequently it becomes impossible in these constructions to make the needle in the form of a cylindrical extension intended to penetrate the injection orifice of the nose.

SUMMARY OF THE INVENTION

It is an object of the present invention to provide a novel injection nozzle which avoids or reduces the disadvantages without detracting from its advantages.

According to the invention, there is provided an injection nozzle for plastics material comprising a rear tubular body, a hollow front body defining a nozzle orifice at one end and detachably secured to said rear tubular body at the other end, an elongate body within said rear tubular body and said hollow front body, at least three radially extending arms on said elongate body cooperating with an annular V-shaped groove formed by chamfers in engaging surfaces of said rear tubular body and said hollow front body to axially fix and radially centre said elongate body and a closure member slidable in said elongate body and biassed to close said nozzle orifice in said hollow front body.

BRIEF DESCRIPTION OF THE DRAWINGS

The invention will now be described in greater detail, by way of example with reference to the drawings, in which:

FIG. 1 is a longitudinal axial section of one form of nozzle in accordance with the invention;

FIG. 2 is a transverse section taken along the line II—II of FIG. 1, and

FIG. 3 is an axial longitudinal section illustrating another form of nozzle in accordance with the invention.

DESCRIPTION OF THE PREFERRED EMBODIMENTS

In accordance with the embodiment illustrated by FIGS. 1 and 2, the nozzle comprises a rear body 1, formed with a threaded connection 2, for assembly on an injection moulding machine. The connection 2 has an axial cylindrical bore 3 debouching into a frustconical cavity 4 formed in the body 1. The cavity 4 diverges in the direction of a chamfer or counter-sunk part 5 formed by the body 1 at the level of the internal edge of a threaded part 6 at the opposite end of the body 1 to the connection 2. The threaded part 6 is intended to receive a front body 7 forming a tip or injection nose 8. The front body 7 has a substantially frust-conical internal cavity 9, from the bottom of which an injection orifice 10, formed at the centre of the nose 8 extends. The cavity 9 is connected by a chamfered or countersunk part 11 to an internal engagement edge from which extends a threaded collar 12 intended to be screwed onto the threaded part 6. The counter-sunk chamfered parts 5 and 11 together form an annular V-shaped groove.

The bodies 1 and 7 ensure, by means of the chamfered or counter-sunk parts 5 and 11, the axial fixing and radial centring of a closure assembly 13 which functions automatically. The closure assembly 13 comprises an elongated body 14 which is profiled to have substantially a surface of revolution and formed at its periphery with radiating arms 15, for example three, the end parts of which engage and are maintained between the counter-sunk parts 5 and 11 during the tightening of the collar 12 on the threaded part 6. The arms 15 can be formed directly or on the contrary result from producing grooves generally axially to the external periphery of the body 14. Thus it initially has substantially the shape of an olive.

Whatever the type of construction used, the body 14 has dimensional relationships chosen to allow the formation of an annular passage of a substantially constant section between its external periphery and the cavities 4 and 9 for the passage of the plastics material to be injection moulded.

The body 14 provides support and guidance for an obturating needle 16 which is mounted free to slide in an axial bore 17 extending from the extremity of the body 14 adjacent the nose 8. The bore 17 debouches in a chamber 18 intended to receive a spring 19 which biasses a point 20 of the needle 16 towards engagement with the injection orifice 10, the retention of a spring 19 in the chamber 18 is ensured by a detachable, substantially olive shaped closure plug 21. The permanent mounting of the spring 19 on the needle 16 can be ensured by means of a peripheral shoulder formed on this latter or again by a disc or cup permanently disposed in the chamber 18.

The above constructional arrangement gives the injection nozzle exceptional functioning qualities and a diversity of application. In fact, the particular construction and arrangement of the closure assembly 14 which is axially fixed and radially centred permits the formation in the interior of the nozzle of an annular passage having no retention zones whatever which are capable of causing an alteration of even a fraction of the plastics material retained in the interior of the nozzle even during the injection phases.

Another advantage resulting from the particular construction of the closure assembly 14 resides in the incorporation of the spring for control of the point 20 in the closure position. This permits the space occupied and the external diameter of the nozzle to be reduced while preventing the direct contact of the said spring with the hot plastics material.

FIG. 3 shows that the nozzle can comprise a front body 7a forming a nose 8a of the plunger type having an orifice 22 into which the cylindrical extension 23 of the needle 16 penetrates at the end of the injection phase. The axial and radial fixing provides the needle with accurate positioning which can ensure a perfect sliding of the extension 23 in the orifice 22.

In addition to the above mentioned advantages, it should be noted that the above described construction allows each user to make up or to modify an injection nozzle function as required by the nature of the material to be injected or of the characteristics of the objects to be made simply by changing the front body 7 and/or the closing device assembly 14 which can be made and sold as interchangeable accessories.

It will be understood that the above description of the present invention is susceptible to various modification changes and adaptations.

What is claimed is:

1. An injection nozzle for plastics material comprising a rear tubular body, a hollow front body defining a nozzle orifice at one end and detachably secured to said rear tubular body at the other end, an elongate body within said rear tubular body and said hollow front body, at least three radially extending arms on said elongage body cooperating with an annular V-shaped groove formed by chamfers in engaging surfaces of said rear tubular body and said hollow front body to axially fix and radially center said elongate body and a closure member slidable in said elongate body and biased to close said nozzle orifice in said hollow front body.

2. An injection nozzle as defined in claim 1, wherein said front and rear bodies define axially engaging surfaces with annular chamfered edges of frusto-conical shape together forming said annular V-shaped groove and said front and rear bodies comprise screw means for connecting said front and rear bodies together and for drawing said front and rear bodies together to retain and fix the ends of said radially extending arms in said V-shaped groove.

3. An injection nozzle as defined in claim 1, wherein said elongate body comprises said radially extending arms integral therewith.

4. An injection nozzle as defined in claim 3 wherein said elongate bodies comprises substantially two frusto conical portions with a common base and defines axially extending grooves in its exterior surface to form said radially extending arms therebetween.

* * * * *